June 10, 1958     J. L. CHANEY     2,837,919
DARKROOM THERMOMETER
Filed April 28, 1954
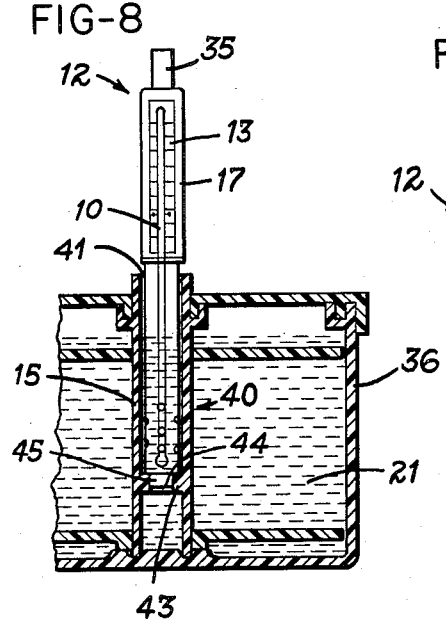
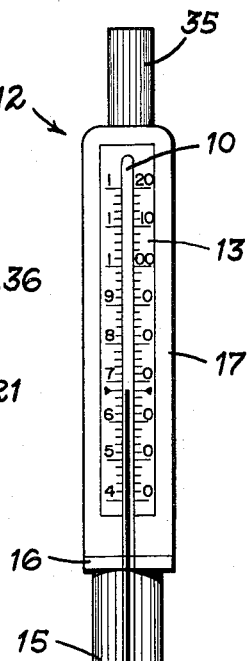
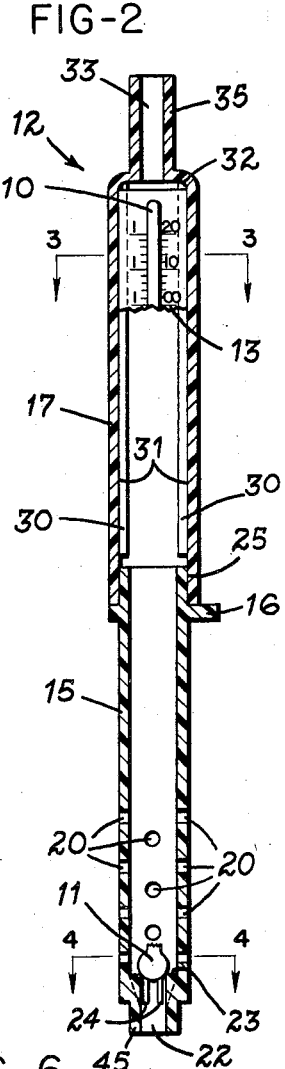
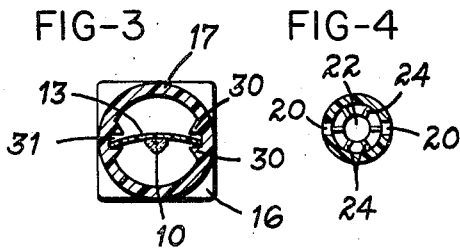
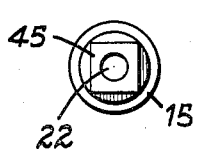
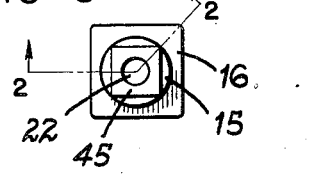
INVENTOR.
JOHN L. CHANEY
BY
Marechal, Biebel, French & Bugg
ATTORNEYS

United States Patent Office 2,837,919
Patented June 10, 1958

2,837,919

DARKROOM THERMOMETER

John L. Chaney, Lake Geneva, Wis.

Application April 28, 1954, Serial No. 426,203

4 Claims. (Cl. 73—374)

This invention relates to thermometers, and more particularly to a stirring thermometer for use in photographic darkrooms and the like.

The present invention provides a darkroom thermometer assembly in which the thermometer bulb is immersed in direct contact with the photographic solutions and liquids for rapid response to temperature changes therein while at the same time being enclosed in an outer protective casing which prevents damage to the relatively delicate bulb and stem of the thermometer.

The thermometer is readily cleanable, and the casing is so formed that the thermometer assembly may be used to rotate the spool of closed development tanks of the type in which the spool is rotated by a removable stem inserted into a central well in the hub of the spool, as well as in development trays in the usual way. It may thus be left immersed in the development liquid in such closed tanks throughout the development period, where it will provide continuous response to temperature changes and will be available for immediate reading at all times. Necessity for a separate removable stem is eliminated, and there is no occasion to change from stem to thermometer and back again.

The thermometer assembly may be made, furthermore, from four easily assembled parts and is adapted to be assembled in accurate operating condition merely by fitting the parts together in predetermined positions determined by the construction of the parts. It is thus readily adapted for construction and assembly on a quantity basis.

One of the principal objects of the invention accordingly is the provision of a darkroom thermometer assembly in which the photographic solutions and liquids are in direct contact with the thermometer bulb providing for rapid response of the thermometer to changes in temperature and which is at the same time protected so as to minimize damage to its sensitive parts.

Another object of the invention is the provision of such a thermometer assembly which is adapted for rotation of the tank spool in closed development tanks and may accordingly be left immersed in the development liquid at all times during use available for constant observation of the temperature of such liquids.

A further object is to provide a darkroom thermometer which is readily cleanable, and which may be simply and economically assembled in manufacture to produce an unusually uniform and accurate product.

Other objects and advantages of the invention will be apparent from the following description, the accompanying drawing and the appended claims.

In the drawing—

Fig. 1 is an elevational view showing a thermometer assembly in accordance with the invention.

Fig. 2 is a longitudinal section through such a thermometer on line 2—2 of Fig. 6.

Fig. 3 is a cross-sectional view on line 3—3 of Fig. 2.

Fig. 4 is a cross-sectional view on line 4—4 of Fig. 2.

Fig. 5 is a bottom view of the thermometer assembly of Fig. 1.

Fig. 6 is a bottom view of the thermometer assembly of Fig. 2.

Fig. 7 is a perspective view on a reduced scale showing the thermometer assembly in use for tray development.

Fig. 8 is a view partly in section showing the thermometer assembly in use in a closed development tank.

Referring to the drawings which illustrate preferred embodiments of the invention, the thermometer assembly includes thermometer tube 10 having a bulb 11 positioned in the lower end of the tubular casing indicated generally by the numeral 12, which has fully enclosed side walls and scale or indicia bearing member 13 in fixed relation with the tube 10. Casing 12 may be made of a transparent material such as plastic or glass. It is formed with a lower portion 15 having a shoulder 16 adjacent to and defining on its upper end a sleeve over which the end of upper portion 17 is received. Shoulder 16 is shown in Fig. 2 as square in shape and thus providing a non-circular base for preventing the thermometer from rolling when laid on its side.

The lower portion of the casing is provided with a series of apertures 20 in its walls adjacent thermometer bulb 11 for passage of the development solutions and other liquids 21 therethrough in use providing direct contact of the liquids with the bulb for rapid response to temperature changes in the liquids. Additionally the bottom of the casing includes an aperture 22 for ready draining of the casing as the thermometer assembly is removed from the liquids. The bottom of this portion is reduced providing a shoulder 23 for fixing the position of the thermometer tube and bulb therein, and a plurality of spaced projecting portions 24 are provided extending partially across opening 22 for supporting and protecting bulb 11 without obstructing free flow of the solutions and liquids through the opening.

Upper portion 17 of the casing is formed with its lower end adapted to fit snugly over the upper end of lower portion 15 and to seat tightly against shoulder 16. When the thermometer is assembled the two parts are sealed together by a suitable water and chemical resistant adhesive indicated by the numeral 25 (Fig. 2). Portion 17 is provided with parallel spaced raised portions 30 on the interior thereof providing a pair of opposed channels 31 for receiving the side edges of indicia bearing member 13 when the device is assembled. The upper end of this portion is also reduced similarly to the lower portion to form shoulder 32 for engaging and positioning the upper end of indicia bearing member 13, and the top portion 17 includes opening 33. Thus casing 12 is open throughout its entire length and the device may readily be cleaned by passing water or other cleaning fluid therethrough, as by simply holding the thermometer assembly under a tap of running water. The top of upper portion 17 may be somewhat reduced as indicated at 35 for more conveniently rotating the casing with the operator's fingers, when the thermometer is used with a closed development tank 36 of the rotating spool type, to rotate such spool in the photographic solutions as shown in Fig. 8.

Tanks of this type ordinarily have a hollow central hub 40 inside of which is a central well 41 through which the development liquid 21 circulates and which is provided with a web 43 having a non-circular socket 44 therein adapted for receiving the correspondingly shaped end of a stem (not shown) for rotating the spool in the photographic fluids. In order that the darkroom thermometer of the invention may be used in place of such stem for manual rotation of the spool, the bottom 45 of lower portion 15 is formed with a non-circular cross-section to engage in socket 44 of the spool, and casing 12 is proportioned to be received in center well 41 of the spool with its upper end extending above the top of tank 36 accessible for manual rotation of the spool.

As will be apparent from the foregoing description the device may quickly and easily be assembled. Thermometer 10 and associated scale or indicia bearing member 13 are first secured together, with the scale secured to the thermometer tube so as accurately to reflect the temperature and with the top edge of the scale extending slightly above the thermometer's upper end. The secured parts are inserted part way into upper portion 17 of the casing, with the side edges of scale 13 received in channels 31 and the indicia bearing face directed toward the transparent front of the casing. The lower portion 15 of the casing is then positioned over thermometer 10 with bulb 11 received on projecting portions 24, and the interfitting ends of the two casing sections 15 and 17 coated with adhesive. When the upper and lower portions are pressed together the interfitting ends of the two portions are seated with the lower edge of portion 17 engaged tightly against shoulder 16, and the parts permanently secured together by adhesive 25.

When the device is so assembled, raised portions 30 and the bottom of channels 31 frictionally engage the edges of scale or indicia bearing member 13 and fix the position of the scale member and attached thermometer radially of the casing, while shoulders 23 with the adjacent extended portions 24 at the lower end of the casing and shoulder 32 at the upper end fix the position thereof axially of the casing. Thus the thermometer and scale member are secured and positioned in proper predetermined position within the casing by assembly thereof, and an unusually simple and accurate result obtained.

Additionally scale member 13 is somewhat flexed (Fig. 3) and slightly resilient. Thus the relatively delicate thermometer and bulb are to a considerable degree suspended within the casing coming into direct contact therewith only where bulb 11 is supported on extensions 24. These extensions tend to cushion the thermometer and scale member in addition to preventing insertion of foreign objects into the interior of the casing and the construction thus provides substantial protection against breakage of the relatively delicate thermometer by reason of shocks or jars.

Lower portion 15 of the casing is proportioned so that when used with development tank 36 of the type described the device will be received in well 41 of the tank with its bulb immersed in photographic solution 21 which circulates into the well and through apertures 20 and opening 22 into the interior of the casing, in direct contact with such solution. Upper portion 17 extends above the tank and the thermometer may be left in position therein with scale member 13 in position to provide a continuous, immediate reading of the temperature, without necessity for withdrawing the customary stem and insertion of a thermometer. Lower end 43 of the casing is engaged in socket 44 of the spool, which may thus be rotated in the photographic solutions in the usual way by manually rotating the top portion of the darkroom thermometer. Inasmuch as the temperature of the solutions is observable at all times any tendency thereof to pass out of the desired critical range will be immediately apparent and may be counteracted by warming or cooling the exterior of the tanks by appropriate means.

The invention thus provides a darkroom thermometer which gives rapid response to temperature changes in the photographic fluids by reason of direct access thereof to the thermometer bulb which is immersed therein, and which nevertheless fully protects the relatively delicate parts of the thermometer. It may accordingly be used in development liquid 21 in open development trays such as tray 49 and for all customary uses of a darkroom thermometer without danger of damage or breakage, while being particularly useful also in connection with development in a closed tank and eliminating any need for use of the customary stem therein.

While the forms of article herein described constitute preferred embodiments of the invention, it is to be understood that the invention is not limited to these precise forms of article and that changes may be made therein without departing from the scope of the invention, which is defined in the appended claims.

What is claimed is:

1. A stirring thermometer assembly for photographic use providing for rapid response to the temperature of the liquids in which it is used and adapted for rotating the spool of a developing tank comprising a casing, an indicia bearing member of resilient material located in said casing, a thermometer tube secured to said indicia bearing member, means on the interior wall of said casing for receiving and supporting said indicia bearing member therein in flexed condition with the thermometer positioned wholly within said casing and readable therethrough and the thermometer bulb at the lower end of said casing, the wall of said casing having apertures adjacent said bulb providing for passage of said liquids into the interior of said casing in direct contact with said bulb, the bottom of said casing being open, said casing having spaced projecting portions extending partially across the opening therein for supporting said tube in cushioned relation to said casing and protecting said bulb, said casing having its lower end shaped to be inserted into engagement with the socket in said spool with its upper end extending above said tank and accessible for manually rotating said spool.

2. A stirring thermometer assembly for photographic use providing for rapid response to the temperature of the liquids in which it is used comprising a casing having fully enclosed side walls, an indicia bearing member of resilient material located within said casing, a thermometer tube secured to said indicia bearing member, spaced raised portions on the interior of the upper portion of said casing adapted to engage and support said indicia bearing member in flexed condition for resiliently supporting said thermometer tube wholly within said casing in cushioned relation therewith for protecting said tube from breakage by shocks or jars, the wall of said casing opposite the face of said indicia bearing member being transparent for reading said temperature therethrough, the bottom and top of said casing being open for passage of said liquids through said bottom into the interior of said casing in direct contact with said bulb for rapid response to the temperature of said liquids and for ready passage of cleaning fluids through said casing.

3. A stirring thermometer assembly for photographic use providing for rapid response to the temperature of the liquids in which it is used comprising a casing having fully enclosed side walls, including an upper portion and a separable lower portion, an indicia bearing member of resilient material located within said casing, a thermometer tube secured to said indicia bearing member, the wall of said casing opposite the face of said indicia bearing member being transparent for reading said temperature therethrough, said upper portion of said casing including parallel spaced raised portions on the interior thereof adapted to engage and support said indicia bearing member in flexed condition for resiliently supporting said thermometer tube within said casing in cushioned relation therewith, said lower portion having apertures in its walls and bottom providing for passage of said liquids into the interior of said casing in direct contact with said bulb for rapid response to the temperature of said liquids and for ready drainage of said casing, said casing including also a non-circular base on its exterior adapted to prevent said casing from rolling.

4. A four piece assembly for a photographic thermometer providing for supporting the thermometer tube in cushioned relation with the casing, adapted to be assembled in operating condition by fitting the parts together in predetermined position determined by the construction of the parts, comprising a two piece casing having an upper portion and a lower portion adapted to be press-fitted together, each of said portions being open at both ends, an indicia bearing member of resilient material within said casing, a thermometer tube secured to said indicia bearing member, said upper casing portion having a pair of opposed channels, said indicia bearing member being received in said channels in flexed condition with the thermometer bulb extending therebelow, said lower casing portion having a plurality of projecting portions extending partially across the lower opening for supporting the bulb of said thermometer and fixing the position of said tube wholly within said casing in substantially suspended condition therein for protecting said tube from breakage by shocks or jars while providing for ready passage of fluids into and out of said casing in direct contact with said thermometer bulb.

References Cited in the file of this patent

UNITED STATES PATENTS

| 900,580 | Nurnberg | Oct. 6, 1908 |
| 1,912,672 | Vissering | June 6, 1933 |
| 2,316,677 | Edwards et al. | Apr. 13, 1943 |
| 2,345,682 | Neuwirth | Apr. 4, 1944 |
| 2,609,689 | Harris | Sept. 9, 1952 |
| 2,641,930 | Kebbon | June 16, 1953 |

FOREIGN PATENTS

| 494,266 | Great Britain | Oct. 24, 1938 |